(12) United States Patent
Hwang (10) Patent No.: US 7,242,658 B2
(45) Date of Patent: Jul. 10, 2007

(54) APPARATUS TO GENERATE A BIT CLOCK AND A METHOD OF GENERATING THE BIT CLOCK

(75) Inventor: Sung-hee Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 10/760,307

(22) Filed: Jan. 21, 2004

(65) Prior Publication Data

US 2004/0151094 A1 Aug. 5, 2004

(30) Foreign Application Priority Data

Jan. 21, 2003 (KR) ...................... 10-2003-0004098

(51) Int. Cl.
*G11B 5/09* (2006.01)
(52) U.S. Cl. ................ 369/59.19; 369/59.1; 369/47.46
(58) Field of Classification Search ...................... None
See application file for complete search history.

(56) References Cited

U.S. PATENT DOCUMENTS

| 4,385,395 A | 5/1983 | Tanaka et al. | |
|---|---|---|---|
| 5,396,109 A | 3/1995 | Oshiba | |
| 5,526,332 A * | 6/1996 | Yamada et al. | 369/47.35 |
| 5,928,293 A | 7/1999 | Jobling et al. | |
| 6,269,058 B1 * | 7/2001 | Yamanoi et al. | 369/47.28 |
| 6,341,355 B1 | 1/2002 | Rutherford et al. | |

FOREIGN PATENT DOCUMENTS

| JP | 05-198101 | 8/1993 |
|---|---|---|
| JP | 07-058736 | 3/1995 |
| JP | 11-45519 | 2/1999 |

* cited by examiner

*Primary Examiner*—Muhammad Edun
(74) *Attorney, Agent, or Firm*—Stein, McEwen & Bui, LLP (57) ABSTRACT

An apparatus and a method to accurately generate a bit clock synchronized with digital data. The apparatus includes an edge detecting unit, a first edge counter, a second edge counter, a first counter, and a bit clock generating unit. The edge detecting unit detects edges of the digital signal. The first edge counter counts a number of the detected edges during a first period. The second edge counter counts the number of the detected edges during a second period. The first counter is reset and counts a system clock if one of the edges is detected during the first period. The bit clock generating unit generates a bit clock based on a count value of the first counter or a channel bit interval, if one of the first edge count value and the second edge count value is equal to a first predetermined value.

40 Claims, 8 Drawing Sheets

APPARATUS TO GENERATE A BIT CLOCK AND A METHOD OF GENERATING THE BIT CLOCK

CROSS-REFERENCE TO RELATED APPLICATIONS

This application claims the priority benefit of Korean Patent Application No. 2003-4098, filed on Jan. 21, 2003 in the Korean Intellectual Property Office, the disclosure of which is hereby incorporated by reference.

BACKGROUND OF THE INVENTION

1. Field of the Invention

The present invention relates to an apparatus which generates a bit clock and a method of generating the bit clock, and more particularly, to an apparatus which generates a bit clock synchronized with digital data generated by a digital data generating system and a method of generating the same.

2. Description of the Related Art

A system that generates digital data, such as a disk driver, generates a bit clock synchronized with the digital data generated thereby and uses the generated bit clock for internal signal processing. For example, the disk driver generates the bit clock synchronized with the digital data and uses the generated bit clock for a decoding operation.

However, in a conventional apparatus to generate the bit clock the digital data having an error is not considered. Thus, if the digital data has the error, the generated bit clock also can include the error.

For example, in the case of the disk drive, if scratches, fingerprints, or dust are on a disk, data reproduced from the disk may include the error. If the generated bit clock includes the error due to the generation of the reproduced data having the error, a reproduced signal from the disc drive may include the error, even after a decoder included in the disk drive performs error correction on the reproduced data having the error.

SUMMARY OF THE INVENTION

The present invention provides an apparatus and a method, which accurately generate a bit clock that is synchronized with digital data generated in a digital data generating system.

The present invention also provides an apparatus and a method, which accurately generate a bit clock that is synchronized with digital data, even if the digital data generated in a digital data generating system includes an error.

The present invention also provides an apparatus which generates a bit clock and a method of generating the bit clock, which accurately generates the bit clock that is synchronized with digital data, even if the digital data reproduced from a disc in a disk drive includes an error.

Additional aspects and/or advantages of the invention will be set forth in part in the description which follows and, in part, will be obvious from the description, or may be learned by practice of the invention.

According to one aspect of the present invention, there is provided an apparatus, which generates a bit clock synchronized with a digital signal. The apparatus includes edge detecting unit, a first edge counter, a second edge counter, a first counter, and a bit clock generating unit. The edge detecting unit detects edges of the digital signal. The first edge counter counts a number of the detected edges during a first period. The second edge counter counts the number of the detected edges during a second period. The first counter is reset and counts the number of the edges of a system clock if one of the edges is detected during the first period. The bit clock generating unit generates the bit clock based on the counted number of the first counter or at a channel bit interval, if the counted number of one of the first edge counter and second edge counter is equal to a first predetermined value.

According to another aspect of the present invention, there is provided an apparatus, which generates a bit clock synchronized with digital data reproduced from a disc in a disk drive. The apparatus includes an edge detecting unit, a first edge counter, a second edge counter, a first counter, and a bit clock generating unit. The edge detecting unit detects edges of the digital data. The first edge counter counts a number of the edges detected during a first period after a first edge is detected by the edge detecting unit. The second edge counter counts the number of the edges detected during a second period, after the first edge is detected and the edges are detected during a period other than the first period. The first counter is reset and counts a system clock if the edges are detected during the first period. The bit clock generating unit generates the bit clock based on count values of the first counter and a channel bit interval, if the count value of the first counter and the second counter is equal to a first predetermined value, and a state of the apparatus is set as the bit clock lock state.

According to an aspect of the present invention, there is further provided a disk driver having a disk includes a pick-up unit picking up data from the disk and outputting a high frequency signal. A radio frequency (RF) amplifying unit amplifies the high frequency signal to a predetermined level. A digital signal processor (DSP) receives the amplified signal to the amplified high frequency signal into a digital signal. A digital filter filters the noise from the digital signal and a decoder decodes the filtered digital signal in synchronization for an input bit clock with error correction on the filtered digital signal. A bit clock generation apparatus includes an edge detecting unit detecting edges of the digital signal, a first edge counter counting a number of the detected edges during a first period, a second edge counter counting the number of the detected edges during a second period, a first counter counting a system clock if the edges are detected during the first period, and a bit clock generating unit generating the bit clock based on a count value of the first counter or at a channel bit interval, if one of the counts of the first edge counter and second edge counter is equal to a first predetermined value.

According to still another aspect of the present invention, there is provided a method of generating a bit clock in a digital data generating system. The method includes detecting edges of a digital signal, creating a first edge count value by counting a number of the edges detected during a first period, creating a second edge count value by counting the number of the edges detected during a second period, setting a state of the digital data generating system as a bit clock lock state when the first edge count value or the second edge count value is equal to a first predetermined value, and generating the bit clock using a channel bit interval and a first count value, wherein the first count value is reset and generated by counting a system clock every time the edges are detected during the first period in the bit clock lock state.

According to yet another aspect of the present invention, there is provided a method of generating a bit clock synchronized with a digital signal generated in a digital data generating system. The method includes generating the bit clock by a channel bit interval in a bit clock unlock state, converting the bit clock unlock state into a bit clock lock ready state if a first edge of the digital signal is detected, generating a first edge count value by counting a number of edges detected during a first period in the bit clock lock ready state, generating a second edge count value by counting the number of the edges detected during a second period in the bit clock lock ready state, converting the bit clock lock ready state into a bit clock lock state when the first edge count value or the second edge count value is equal to a first predetermined value, and generating the bit clock based on one of a first count value, wherein the first count value is reset and generated by counting a system clock every time one of the edges is detected during the first period in the bit clock lock state.

BRIEF DESCRIPTION OF THE DRAWINGS

The above and/or other aspects and advantages of the present invention will become more apparent by describing in detail exemplary aspects thereof with reference to the attached drawings in which.

DETAILED DESCRIPTION OF THE PREFERRED EMBODIMENTS

Reference will now be made in detail to the aspects of the present invention, examples of which are illustrated in the accompanying drawings, wherein like reference numerals refer to the like elements throughout. The aspects are described below to explain the present invention by referring to the figures.

Figure 1:
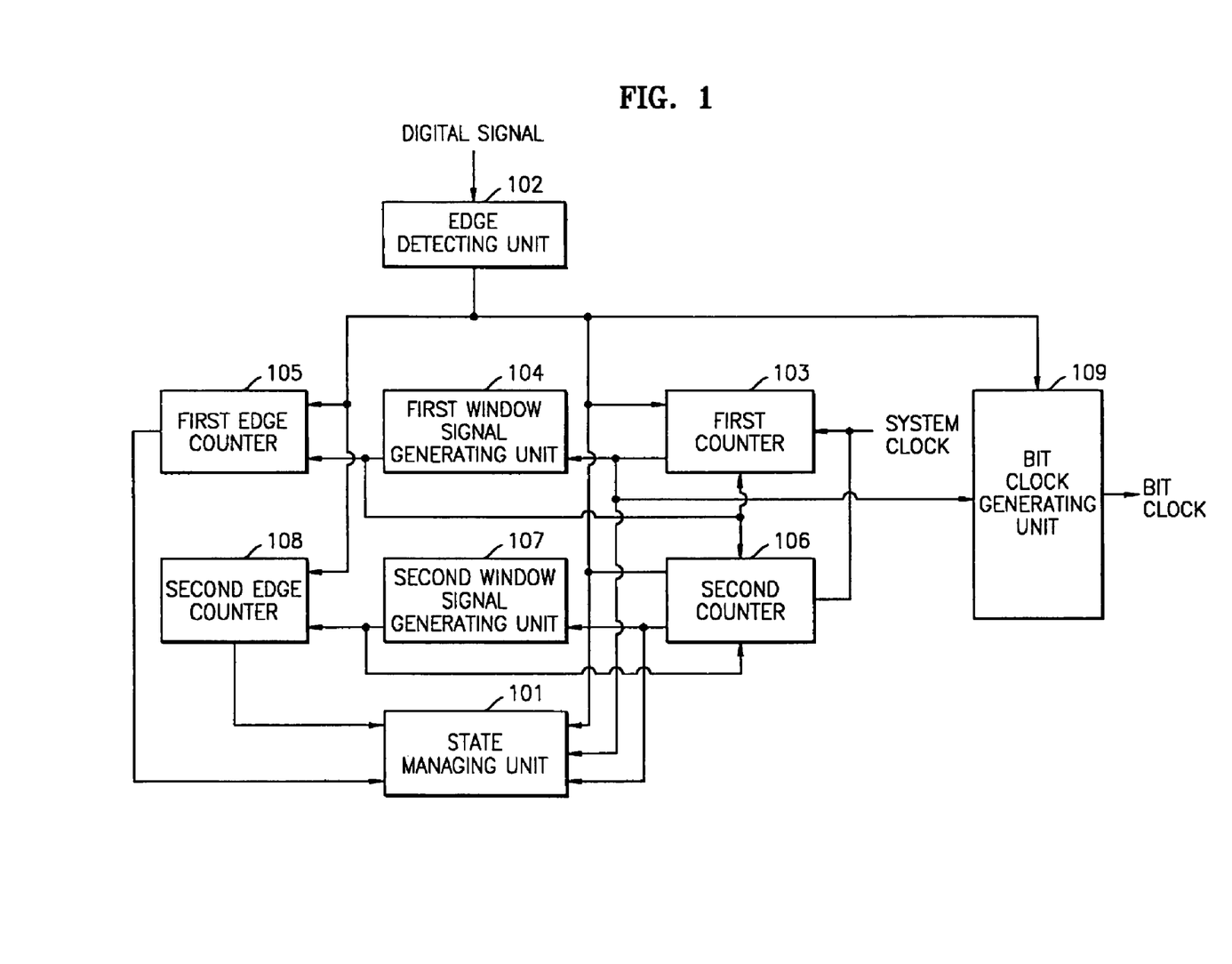
FIG. 1 is a functional block diagram of an apparatus generating a bit clock, according to an aspect of the present invention.

Referring to FIG. 1, an apparatus generating a bit clock, according to an aspect of the present invention, includes a state managing unit 101, an edge detecting unit 102, a first counter 103, a first window signal generating unit 104, a first edge counter 105, a second counter 106, a second window signal generating unit 107, a second edge counter 108, and a bit clock generating unit 109.

The state managing unit 101 sets a current state of the apparatus generating the bit clock based on results of monitoring outputs of the edge detecting unit 102, the first counter 103, the second counter 106, the first edge counter 105, and the second edge counter 108 and notifies the first counter 103, the first window signal generating unit 104, the first edge counter 105, the second counter 106, the second window signal generating unit 107, the second edge counter 108, and the bit clock generating unit 109 of the set current state. The state of the apparatus generating the bit clock may be set to a bit clock unlock state, a bit clock lock ready state, or a bit clock lock state, in accordance with an aspect of the present invention.

Figure 2:
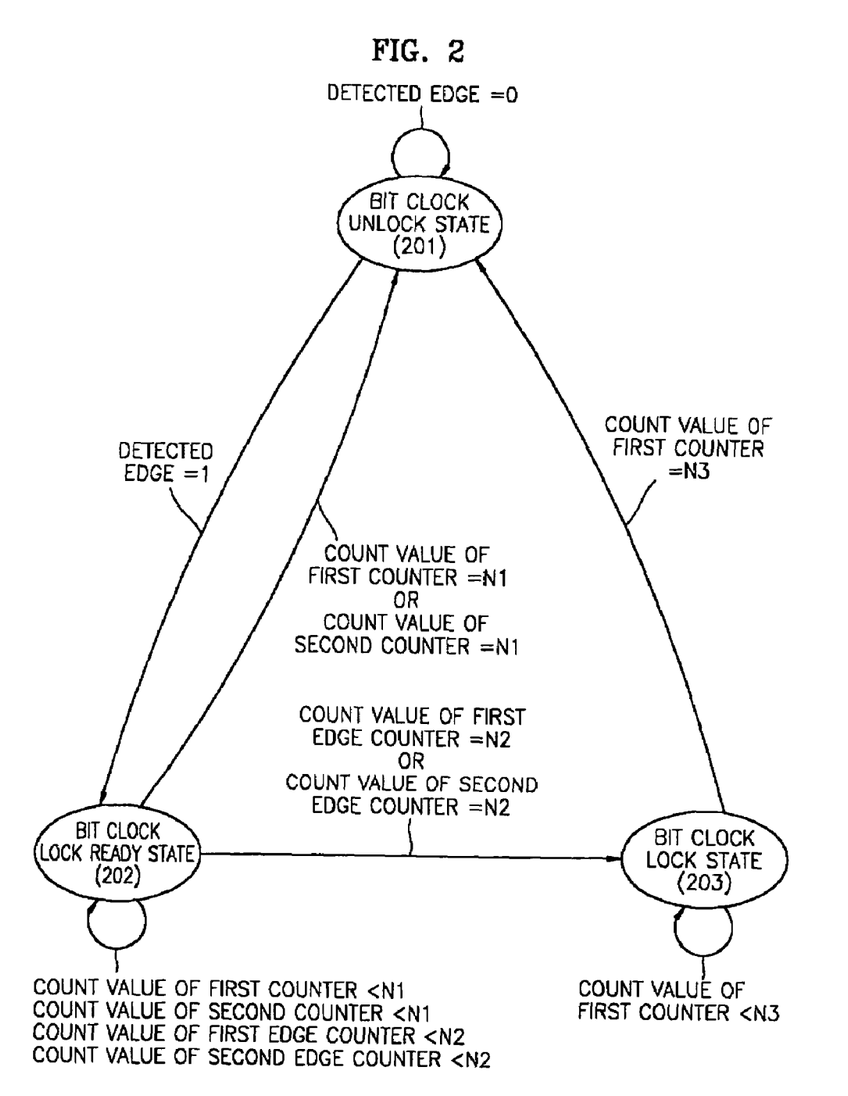
FIG. 2 is a state diagram of the apparatus generating the bit clock, which is managed by a state managing unit of FIG. 1.

As shown in FIG. 2, when the state of the apparatus generating the bit clock is in a bit clock unlock state 201, if at least one edge is not detected by the edge detecting unit 102 (detected edge=0), the state managing unit 101 maintains the bit clock unlock state 201.

However, when the state of the apparatus generating the bit clock is in the bit clock unlock state 201, if the at least one of the edges is detected by the edge detecting unit 102 (detected edge=1), the state managing unit 101 converts the bit clock unlock state 201 into a bit clock lock ready state 202.

In the bit clock lock ready state 202, if count values of the first and second counters 103 and 106 are respectively less than a predetermined value N1 and the count values of the first and second edge counters 105 and 108 are respectively less than a predetermined value N2, the state managing unit 101 maintains the bit clock lock ready state 202.

In the bit clock lock ready state 202, however, if the count value of the first counter 103 or the second counter 106 is equal to the predetermined value N1, the state managing unit 101 converts the bit clock lock ready state 202 into the bit clock unlock state 201. In the bit clock lock ready state 202, if the count value of the first edge counter 105 or the second edge counter 108 is equal to the predetermined value N2, the state managing unit 101 converts the bit clock lock ready state 202 into the bit clock lock state 203.

In the bit clock lock state 203, if the count value of the first counter 103 is less than a predetermined value N3, the state managing unit 101 maintains the bit clock lock state 203. However, if the count value of the first counter 103 is equal to the predetermined value N3, the state managing unit 101 converts the bit clock lock state 203 into the bit clock unlock state 201. The predetermined values N1 and N3 may be different from or similar to each other.

In the bit clock unlock state 201, the apparatus generating the bit clock of FIG. 1 operates the state managing unit 101, the edge detecting unit 102, the first counter 103, and the bit clock generating unit 109, such that the bit clock is generated.

More specifically, the edge detecting unit 102 detects edges of an input digital signal. The edge detecting unit 102 detects either falling edges or rising edges of the input digital signal. For example, if the edge detecting unit 102 is set to detect the falling edges, the edge detecting unit 102 detects the falling edges of the input digital signal. In the same manner, if the edge detecting unit 102 is set to detect the rising edges, the edge detecting unit 102 detects the rising edges of the input digital signal.

If the edges of the input digital signal are not detected by the edge detecting unit 102, the state managing unit 101 maintains the bit clock unlock state 201.

In the bit clock unlock state 201, the first counter 103 is reset by a channel bit interval (or a channel bit unit) and counts the system clock.

Figure 3:
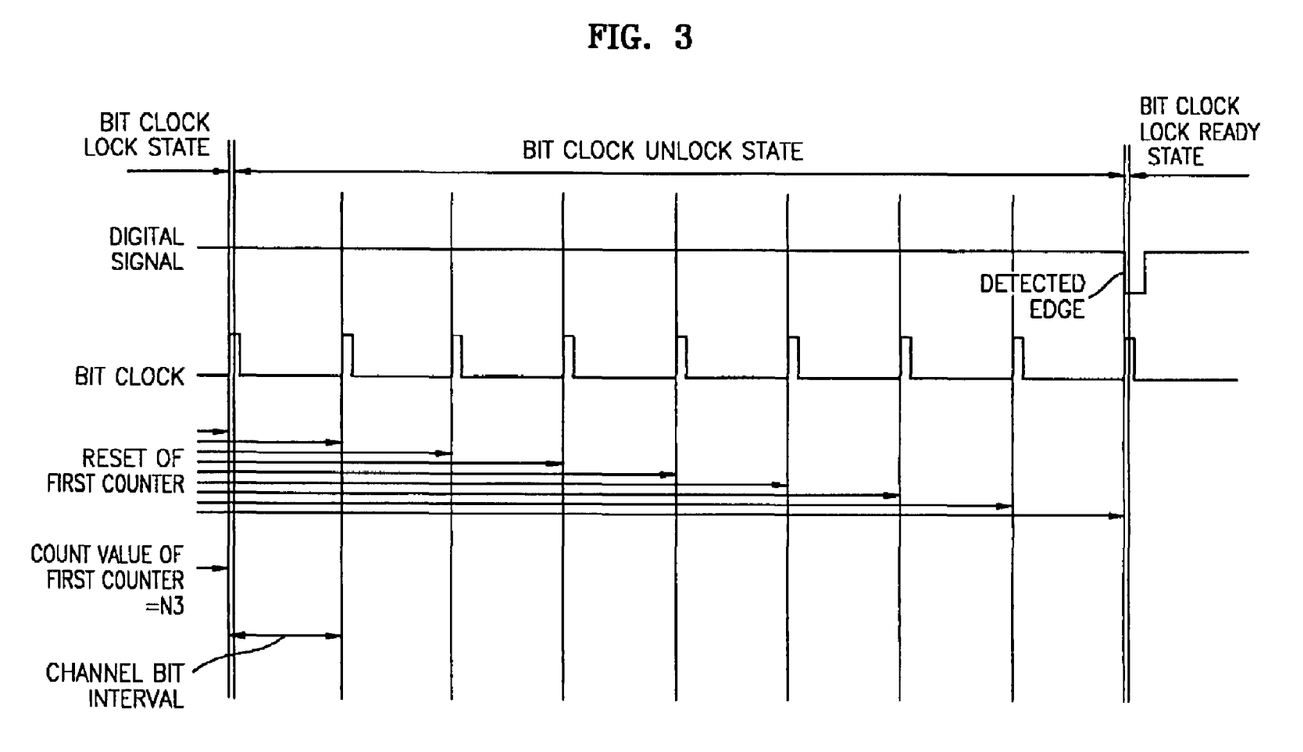
FIG. 3 is a timing diagram of the apparatus generating the bit clock of FIG. 1 in a bit clock unlock state.

In the bit clock unlock state 201, the bit clock generating unit 109 generates the bit clock as shown in FIG. 3. That is, while the edges of the input digital signal have not been detected by the edge detecting unit 102, the bit clock generating unit 109 generates the bit clock every time the first counter 103 is reset by a channel bit interval.

In the bit clock unlock state 201, if one of the edges of the input digital signal is detected by the edge detecting unit 102 for the first time, the state managing unit 101 converts the bit clock unlock state 201 into the bit clock lock ready state 202.

The first counter 103 is reset in synchronization with the detected edges and counts the system clock.

In the bit clock lock ready state 202, the first counter 103 is not reset by the channel bit interval. Instead, the first counter 103 is reset if the edges are detected within a first window signal period. A first window signal is generated by the first window signal generating unit 104 based on the count value of the first counter 103.

Figure 4:
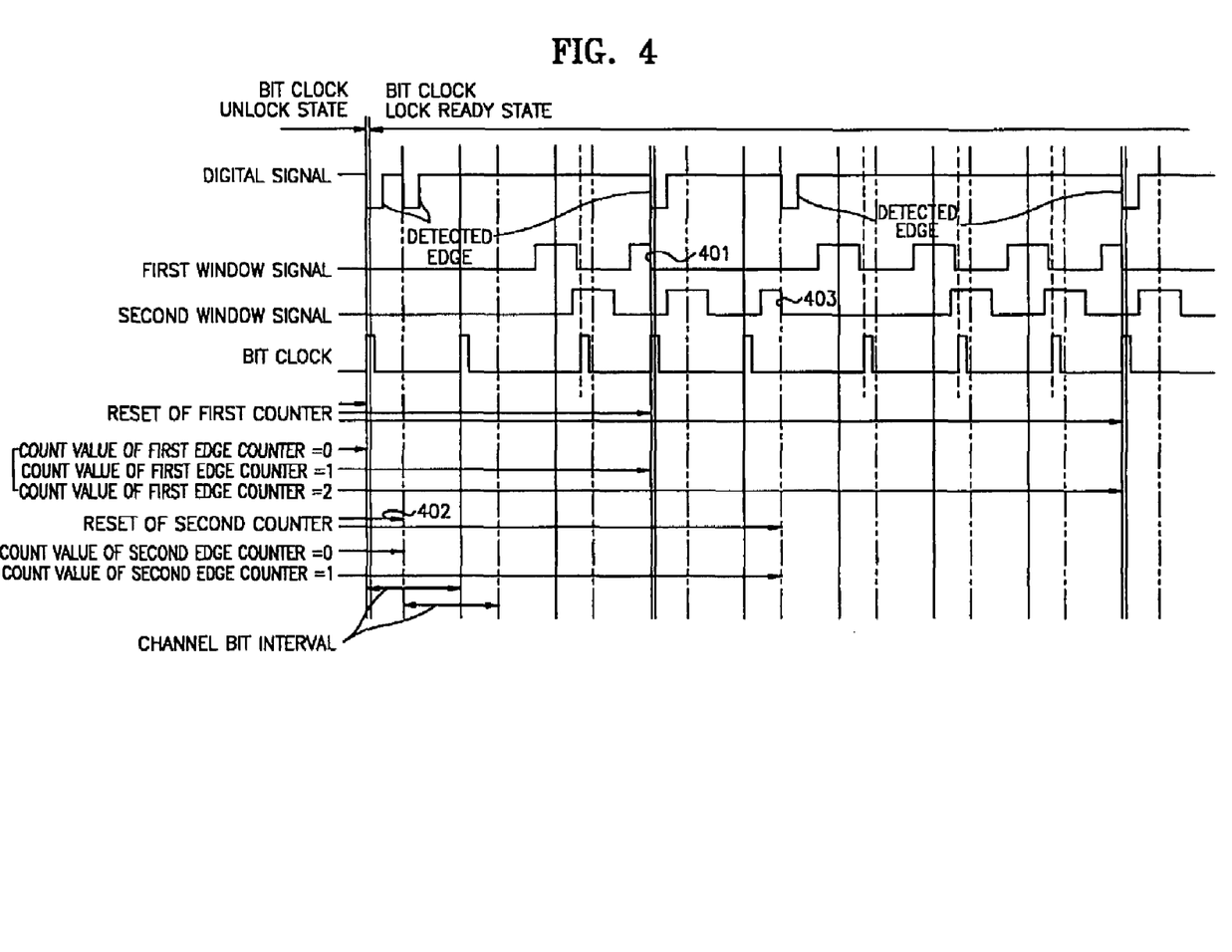
FIG. 4 is a timing diagram of the apparatus generating the bit clock of FIG. 1 in a bit clock lock ready state.

The first window signal generating unit 104 generates the first window signal based on the count value of the first counter 103 as shown in FIG. 4. The first window signal period may be determined based on a minimum T of the input digital signal. In FIG. 4, the minimum T of the input digital signal is 2T. Thus, the first window signal is not generated at a first T, but generated at a second T, after the first counter 103 is reset. As such, if the edges are not detected during the first window signal period, the bit clock generating unit 109 generates the bit clock by the channel bit interval as shown in FIG. 4.

However, if the edges are detected during the first window signal period, the first counter 103 is reset as shown in FIG. 4. Thus, a logic state of the first window signal is changed, as indicated by a point 401 of FIG. 4, and the bit clock generating unit 109 generates the bit clock irrespective of the channel bit interval.

The first edge counter 105 increments a count value by 1 every time one of the edges is detected by the edge detecting unit 102 during the first window signal period. The count value of the first edge counter 105 is provided to the state managing unit 101.

After the first edge used to reset the first counter 103 is detected, if one of the edges is detected for the first time during a period other than a first period, the second counter 106 is reset in synchronization with the detected edge and counts the system clock. Thus, the second counter 106 receives a signal indicating whether one of the edges is detected or not and the first window signal from the edge detecting unit 102 and the first window signal generating unit 104, respectively. As such, the second counter 106 is reset at a point 402 of FIG. 4.

The second window signal generating unit 107 generates a second window signal based on a count value of the second counter 106 in the same manner as the first window signal generating unit 104. Thus, the second window signal is generated as shown in FIG. 4.

If the edges are detected during a second window signal period in which the second window signal is generated by the second window signal generating unit 107, the second counter 106 is reset in synchronization with the detected edges and counts the system clock. Thus, the logic state of the second window signal is changed, as indicated by a point 403 of FIG. 4. Thus, the second counter 106 receives the second window signal generated by the second signal window generating unit 107.

The second edge counter 108 increments a count value by 1 every time one of the edges is detected by the edge detecting unit 102 during the second window signal period.

In the bit clock lock ready state 202 of the apparatus, which generates the bit clock of FIG. 1, the state managing unit 101, the edge detecting unit 102, the first counter 103, the first window signal generating unit 104, the first edge counter 105, the second edge counter 106, the second window signal generating unit 107, the second edge counter 108, and the bit clock generating unit 109 operate as described above. In addition, the bit clock generating unit 109 generates the bit clock every time the first counter 103 is reset. If the first counter 103 is not reset, the bit clock generating unit 109 generates the bit clock during the channel bit interval. In other words, the bit clock generating unit 109 gives priority to the count value of the first counter 103 over the channel bit interval.

In the bit clock lock ready state 202, the state managing unit 101 monitors the count values of the first and second edge counters 105 and 108. If the count value of the first edge counter 105 or the second edge counter 108 is equal to the predetermined value N2, the state managing unit 101 converts the bit clock lock ready state 202 into the bit clock lock state 203.

Figure 5:
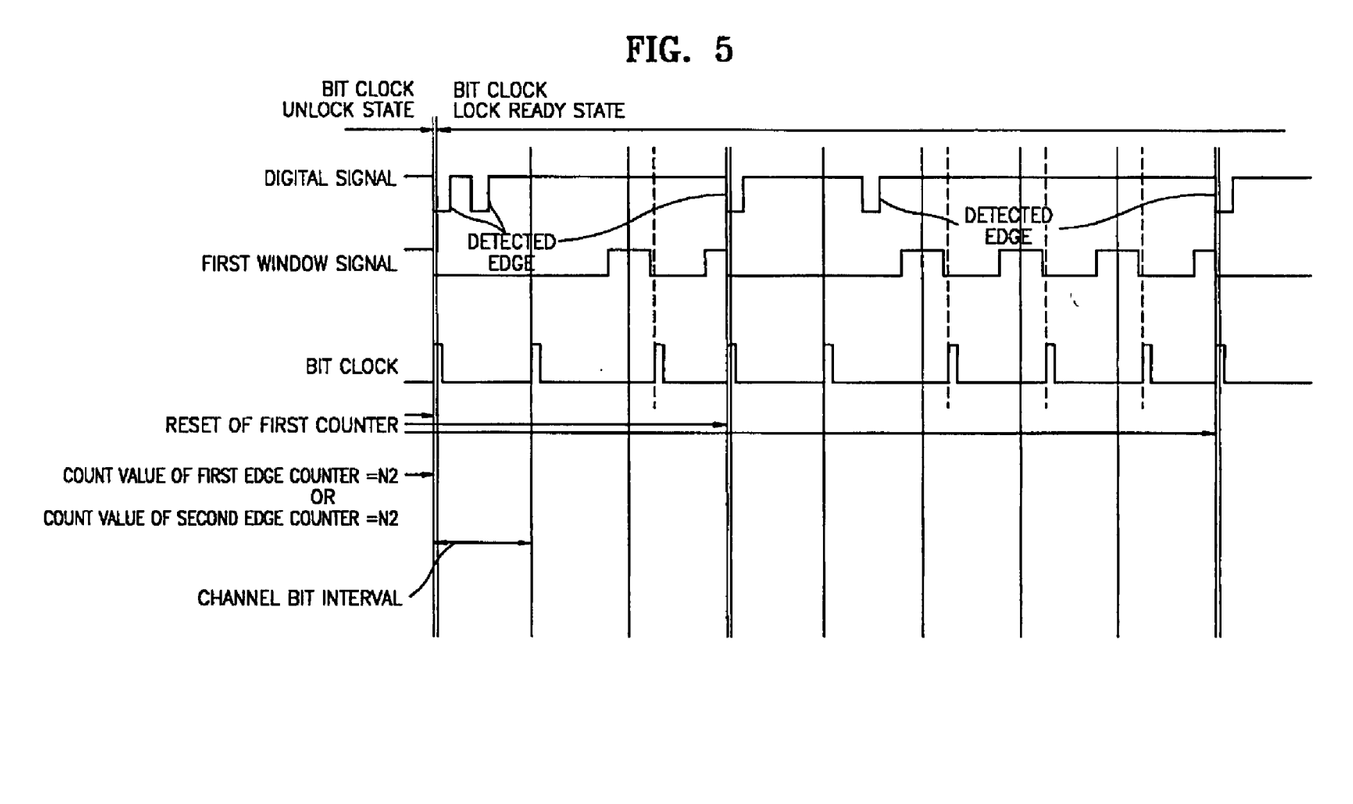
FIG. 5 is a timing diagram of the apparatus generating the bit clock of FIG. 1 in a bit clock lock state.

That is, as shown in FIG. 5, if the count value of the first edge counter 105, which is increased by 1 every time one of the edges is detected during the first window signal period, is equal to the predetermined value N2, the state managing unit 101 converts the bit clock lock ready state 202 into the bit clock lock state 203.

In the bit clock lock ready state 202, if the edges have not been detected during the first window signal period and the count value of the first counter 103 is equal to the predetermined value N1, or if the edges have not been detected during the second window signal period and the count value of the second counter 106 is equal to the predetermined value N1, the state managing unit 101 converts the bit clock lock ready state 202 into the bit clock unlock state 201.

In the bit clock lock state 203, the first counter 103 is reset every time one of the edges is detected during the first window signal period, in the same manner as in the bit clock lock ready state 202.

The bit clock generating unit 109 generates the bit clock based on the count value of the first counter 103 or the channel bit interval. That is, in the same manner as in the bit clock lock ready state 202, the bit clock generating unit 109 generates the bit clock every time the first counter 103 is reset and/or by using the channel bit interval during the counting period of the first counter 103. The bit clock generating unit 109 gives priority to the count value of the first counter 103 over the channel bit interval in the bit clock lock state 203.

In the bit clock lock state 203 of the apparatus that generates the bit clock, the state managing unit 101, the edge detecting unit 102, the first counter 103, and the first window signal generating unit 104 operate as described above.

As such, the apparatus that generates the bit clock of FIG. 1 disregards the edges detected during the periods other than the first and second window signal periods.

Figure 6:
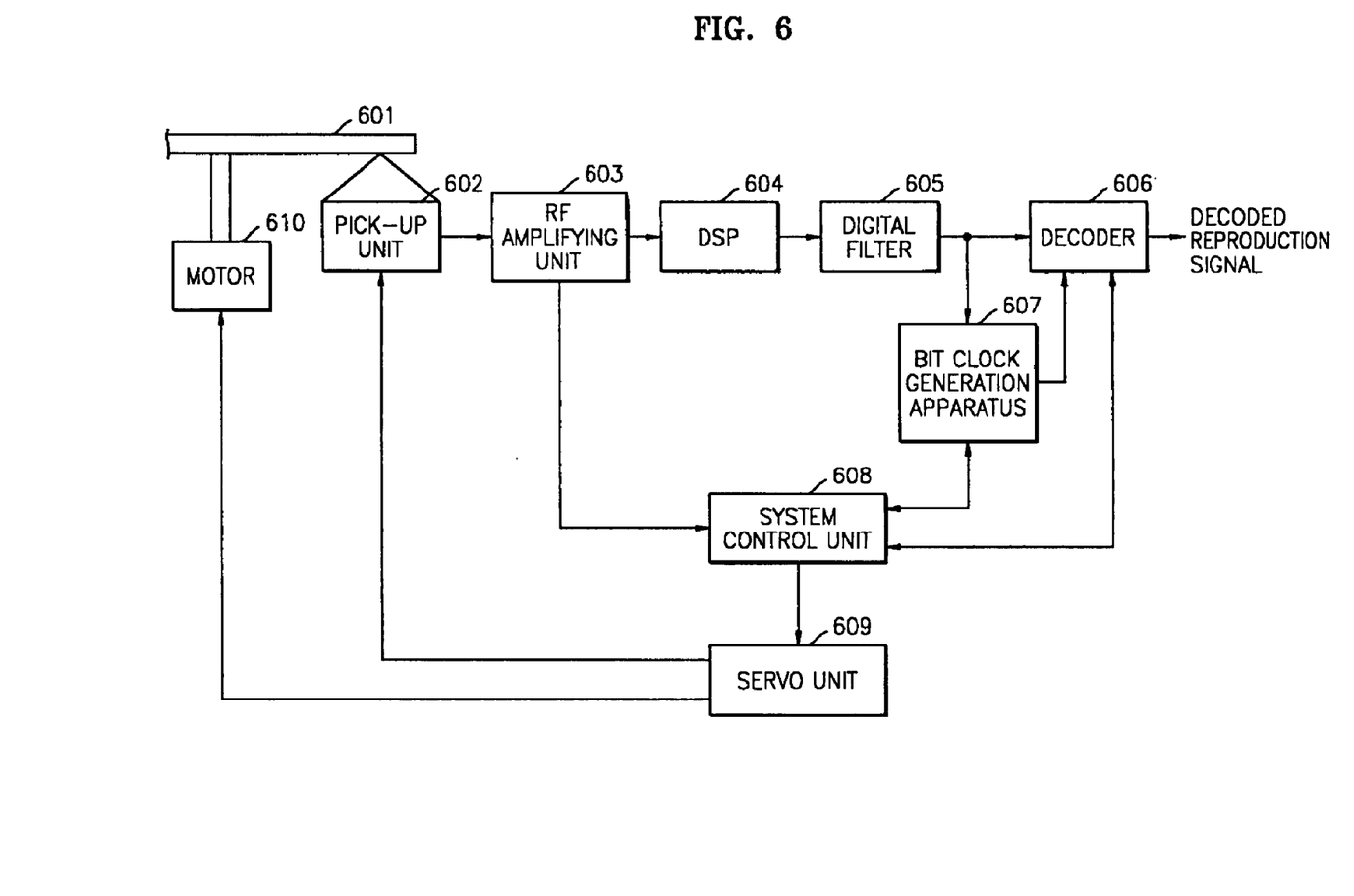
FIG. 6 is a block diagram of a disc drive having the apparatus generating the bit clock, according to an aspect of the present invention.

FIG. 6 shows an example of a disk driver having a bit clock generation apparatus 607, according to an aspect of the present invention.

A system control unit 608 controls a servo unit 609, such that the servo unit 609 controls a motor 610 rotating a disk 601 and a pick-up unit 602. The pick-up unit 602 picks up data from the disk 610 and outputs a high-frequency signal.

A radio frequency (RF) amplifying unit 603 amplifies the high frequency signal output from the pick-up unit 602 to a predetermined level and outputs the amplified signal to a digital signal processor (DSP) 604. The DSP 604 converts the amplified high frequency signal into a digital signal. A digital filter 605 filters the noise from the digital signal. A decoder 606 decodes the filtered digital signal in synchronization for an input bit clock with error correction on the filtered digital signal.

The bit clock generation apparatus 607 is configured as shown in FIG. 1. If the system control unit 608 includes functions of the state managing unit 101 of FIG. 1, the bit clock generation apparatus 607 may exclude the state managing unit 101.

As such, even if the data reproduced from the disk 601, which may include scratches, fingerprints, or dust thereon, includes an error, the disk drive can accurately and safely generate the bit clock through the bit clock generation apparatus 607. Thus, the decoder 606 can decrease overhead of the error correction on the reproduced data having the error.

Figure 7A:
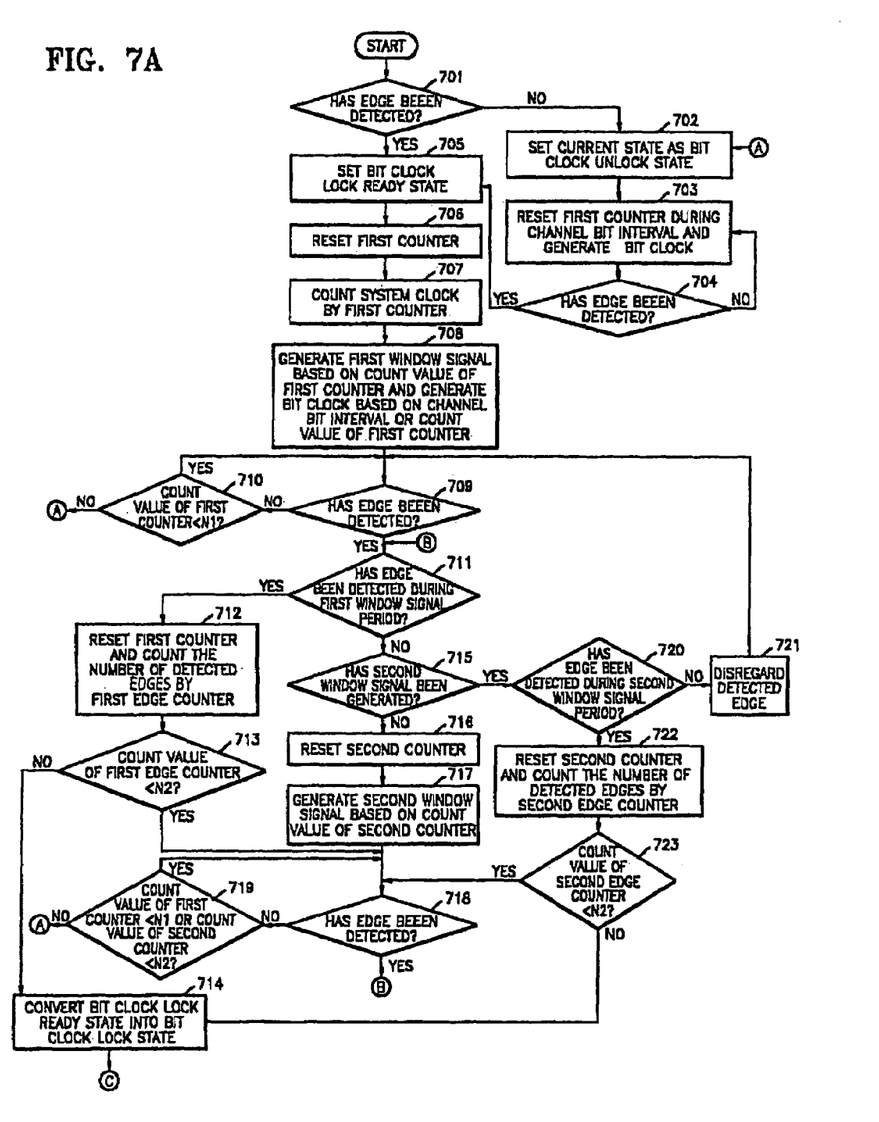
FIGS. 7A and 7B are flowcharts illustrating a method of generating the bit clock, according to an aspect of the present invention.
Figure 7B:
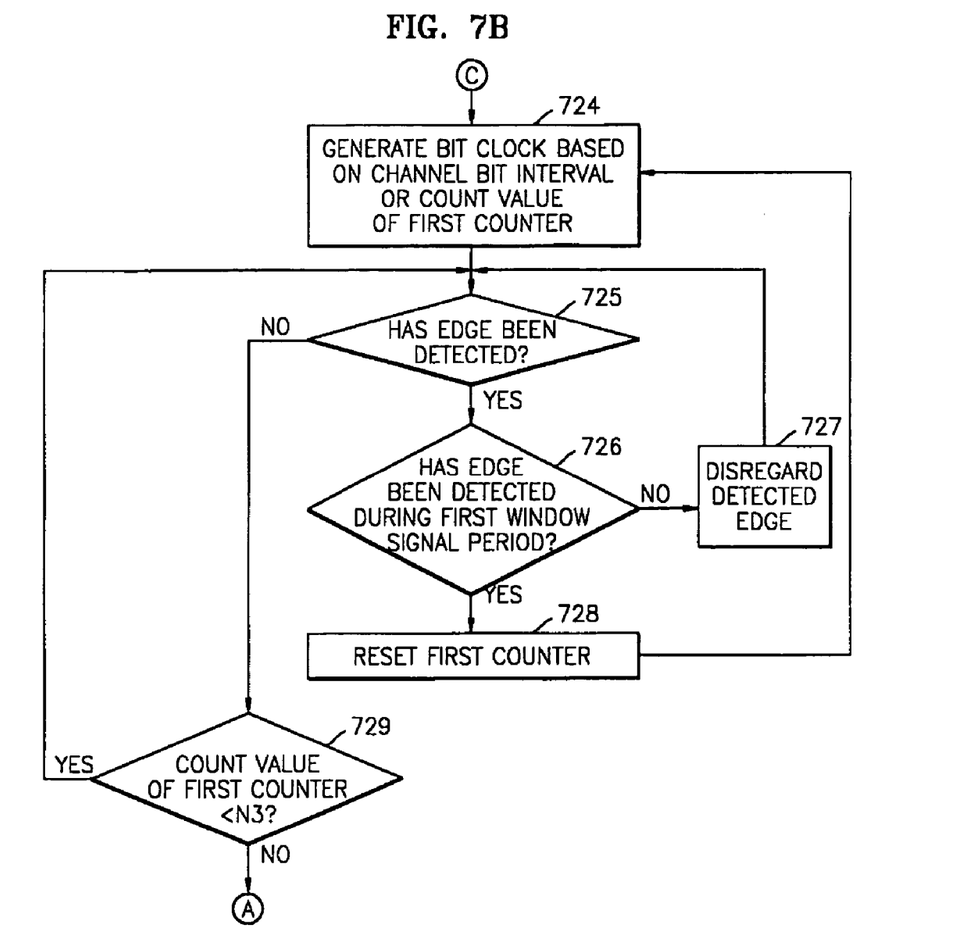

FIGS. 7A and 7B are flowcharts illustrating a method of generating the bit clock signal, according to an aspect of the present invention.

If the digital signal is input to the bit clock generation apparatus 607, at operation 701, the bit clock generation apparatus 607 determines whether the edges of the input digital signal is detected. If it is determined that the edges have not been detected, at operation 702, the state of the bit clock generation apparatus 607 is set to the bit clock unlock state. At operation 703, the bit clock generation apparatus 607 resets the first counter 103 by the channel bit interval and generates the bit clock.

At operation 704, the bit clock generation apparatus 607 determines whether the edges have not been detected. If it is determined that the edges have not been detected, the bit clock generation apparatus 607 goes back to operation 703 and generates the bit clock by the channel bit interval.

However, if it is determined that the edges of the input digital signal is detected at operation 701 or operation 704, at operation 705, the bit clock generation apparatus 607 sets the bit clock unlock state to the bit clock lock ready state.

Thus, at operation 706, the bit clock generation apparatus 607 resets the first counter 103. At operation 707, the first counter 103 counts the system clock.

At operation 708, the bit clock generation apparatus 607 generates the first window signal based on the count value of the first counter 103 and generates the bit clock based on the channel bit interval and the count value of the first counter 103. Here, the bit clock generation apparatus 607 gives priority to the count value of the first counter 103 over the channel bit interval.

At operation 709, the bit clock generation apparatus 607 determines whether another of the edges of the input digital signal is detected. If it is determined that another of the edges has not been detected at operation 709, at operation 710, the bit clock generation apparatus 607 determines whether the count value of the first counter 103 is less than the predetermined value N1. If it is determined that the count value of the first counter 103 is less than the predetermined value N1, the bit clock generation apparatus 607 goes back to operation 709.

However, at operation 710, if it is determined that the count value of the first counter 103 is not less than the predetermined value N1, the bit clock generation apparatus 607 goes back to operation 702.

At operation 709, if it is determined that the edges is detected, at operation 711, the bit clock generation apparatus 607 determines whether one of the edges is detected during the first window signal period. If it is determined that the edges are detected during the first window signal period, at operation 712, the bit clock generation apparatus 607 resets the first counter 103 and counts the number of the detected edges by the first edge counter 105.

At operation 713, the bit clock generation apparatus 607 determines whether the count value of the first edge counter 105 is less than the predetermined value N2. If the count value of the first edge counter 105 is not less than the predetermined value N2, at operation 714, the bit clock generation apparatus 607 converts the bit clock lock ready state into the bit clock lock state.

At operation 713, if the count value of the first edge counter 105 is less than the predetermined value N2, the bit clock generation apparatus 607 proceeds to operation 718.

At operation 711, if it is determined that the edges are detected during a period other than the first window signal period, at operation 715, the bit clock generation apparatus 607 determines whether the second window signal is generated. If it is determined that the second window signal has not been generated, at operation 716, the bit clock generation apparatus 607 resets the second counter 106 and, at operation 717, the bit clock generation apparatus 607 generates the second window signal based on the count value of the second counter 106.

At operation 718, the apparatus that generates the bit clock determines whether the edges are detected. If it is determined that the edges have not been detected, at operation 719, the bit clock generation apparatus 607 determines whether the count value of the first counter 103 or second counter 106 is less than the predetermined value N1. If it is determined that the count values of the first counter 103 and the second counter 106 are not less than the predetermined value N1, the bit clock generation apparatus 607 goes back to operation 702.

However, at operation 719, if it is determined that the count value of the first counter 103 or second counter 106 is less than the predetermined value N1, the bit clock generation apparatus 607 goes back to operation 718.

At operation 715, if it is determined that the second window signal is generated at operation 720, the apparatus that generates the bit clock signal 607 determines whether the edges are detected during the second window signal period. If it is determined that the edges are detected during the period other than the second window signal period, the bit clock generation apparatus 607 disregards the edges detected at operation 721 and goes back to operation 709.

However, if it is determined that the edges are detected during the second window signal period, at operation 722, the bit clock generation apparatus 607 resets the second counter 106 and the second edge counter 108 counts the number of the detected edges by the second edge counter 108. At operation 723, the bit clock generation apparatus 607 determines whether the count value of the second edge counter 108 is less than the predetermined value N2. If it is determined that the count value of the second edge counter 108 is less than the predetermined value N2, the bit clock generation apparatus 607 proceeds to operation 718.

However, at operation 723, if it is determined that the count value of the second edge counter 108 is not less than the predetermined value N2, the bit clock generation apparatus 607 proceeds to operation 714 and converts the bit clock lock ready state to the bit clock lock state.

After the bit clock generation apparatus 607 is set as the bit clock lock state, at operation 724, the bit clock generation apparatus 607 generates the bit clock based on the channel bit interval or the count value of the first counter 103. Here, the bit clock generation apparatus 607 gives priority to the count value of the first counter 103 over the channel bit interval.

At operation 725, if it is determined that the edges have not been detected, at operation 729, the bit clock generation apparatus 607 determines whether the count value of the first counter 103 is less than the predetermined value N3. If it is determined that the count value of the first counter 103 is less than the predetermined value N3, the bit clock generation apparatus 607 proceeds to operation 725. However, if the count value of the first counter 103 is not less than the predetermined value N3, the bit clock generation apparatus 607 goes back to operation 702.

If it is determined that the edges are detected in operation 725, at operation 726, the bit clock generation apparatus 607 determines whether the edges are detected during the first window signal period. At operation 726, if it is determined that the edges are detected during a period other than the first window signal period, the bit clock generation apparatus 607 disregards the detected edges at operation 727 and goes back to operation 725.

However, if it is determined that the edges are detected during the first window signal in step 726, the bit clock generation apparatus 607 resets the first counter 103 at operation 728, proceeds to operation 724, and generates the bit clock.

The predetermined values N1, N2, and N3 are determined in a system designing process.

According to an aspect of the present invention, it is possible to accurately generate a bit clock in synchronization with digital data by detecting edges of digital signals using a plurality of window signals. Thus, a system can accurately and safely perform internal signal processing by using the generated bit clock.

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. An apparatus to generate a bit clock synchronized with a digital signal, comprising:
   an edge detecting unit detecting edges of the digital signal;
   a first edge counter counting a number of the detected edges during a first period;
   a second edge counter counting the number of the detected edges during a second period;
   a first counter counting the number of the edges of a system clock if one of the edges is detected during the first period; and
   a bit clock generating unit generating the bit clock based on the counted number of the first counter or at a channel bit interval, if the counted number of one of the first edge counter and second edge counter is equal to a first predetermined value.

2. The apparatus of claim 1, wherein the first edge counter disregards the edges detected during a period other than the first period, and the second edge counter disregards the edges detected during the period other than the second period.

3. The apparatus of claim 2, wherein the bit clock generating unit generates the bit clock irrespective of the channel bit interval if the first counter is reset.

4. The apparatus of claim 1, wherein the bit clock generating unit gives priority to the count value of the first counter over the channel bit interval.

5. The apparatus of claim 1, wherein the first period is set based on the count value of the first counter.

6. The apparatus of claim 5, wherein, if the edge detecting unit detects a first edge of the digital signal, the first counter is reset and counts the system clock, where the first counter is reset every time the first edge is detected during the first period.

7. The apparatus of claim 6, further comprising:
   a first window signal generating unit generating a first window signal as a signal indicating the first period based on the count value of the first counter and outputting the first window signal to the first edge counter.

8. The apparatus of claim 7, further comprising:
   a second counter wherein, if one of the edges is detected during a period other than the first window signal period after the first edge is detected, the second counter is reset, counts the system clock, and is reset every time the one of the edges is detected during the second period.

9. The apparatus of claim 8, wherein the second period is set based on the count value of the second counter.

10. The apparatus of claim 8, further comprising:
    a second window signal generating unit generating a second window signal as a signal indicating the second period based on the count value of the second counter and outputting the second window signal to the second edge counter.

11. The apparatus of claim 8, further comprising:
    a state managing unit monitoring outputs of the first counter, the second counter, the edge detecting unit, the first edge counter, and the second edge counter and managing a state of the apparatus generating the bit block.

12. The apparatus of claim 11, wherein the state is one of a bit clock unlock state, a bit clock lock ready state, and a bit clock lock state.

13. The apparatus of claim 12, wherein the state managing unit sets the state of the apparatus generating the bit clock as the bit clock unlock state if the edges of the digital signal is detected by the edge detecting unit, one of the count values of the first counter and second counter is equal to a second predetermined value in the bit clock lock ready state, or the count value of the first counter is equal to a third predetermined value in the bit clock lock state.

14. The apparatus of claim 12, wherein the state managing unit sets the state of the apparatus generating the bit clock as the bit clock lock ready state if the first edge is detected by the edge detecting unit in the bit clock unlock state, and sets the state of the apparatus generating the bit clock as the bit clock lock state if one of the count values of the first counter and second counter is equal to the first predetermined value in the bit clock lock ready state.

15. The apparatus of claim 14, wherein, in the bit clock lock ready state, the bit clock generating unit generates the bit clock based on one of the count value of the first counter and the channel bit interval.

16. The apparatus of claim 12, wherein, in the bit clock unlock state, the bit clock generating unit generates the bit clock by the channel bit interval.

17. The apparatus of claim 1, further comprising:
    a state managing unit setting a state of the apparatus generating the bit clock as the bit clock lock state if one of the counts of the first edge counter and the second edge counter is equal to the first predetermined value.

18. An apparatus generating a bit clock synchronized with digital data reproduced from a disc in a disk drive, comprising:
    an edge detecting unit detecting edges of the digital data;
    a first edge counter counting a number of the edges detected during a first period after the first edge is detected by the edge detecting unit;
    a second edge counter counting the number of the edges detected during a second period, after the first edge is detected and the edge are detected during a period other than the first period;

a first counter counting a system clock if the edge is detected during the first period; and a bit clock generating unit generating the bit clock based on one of count values of the first counter and a channel bit interval, if the count value of the first counter and second counter is equal to a first predetermined value, and a state of the apparatus is set as the bit clock lock state.

19. The apparatus of claim 18, wherein the bit clock generating unit gives priority to the count value of the first counter over the channel bit interval.

20. A disk driver having a disk, comprising:
a pick-up unit picking up data from the disk and outputting a high frequency signal;
a radio frequency (RF) amplifying unit amplifying the high frequency signal to a predetermined level;
a digital signal processor (DSP) receiving the amplified signal to the amplified high frequency signal into a digital signal;
a digital filter filtering the noise from the digital signal;
a decoder decoding the filtered digital signal in synchronization for an input bit clock with error correction on the filtered digital signal; and
a bit clock generation apparatus comprising
an edge detecting unit detecting edges of the digital signal,
a first edge counter counting a number of the detected edges during a first period,
a second edge counter counting the number of the detected edges during a second period,
a first counter counting a system clock if the edges are detected during the first period, and
a bit clock generating unit generating the bit clock based on a count value of the first counter or at a channel bit interval, if one of the counts of the first edge counter and second edge counter is equal to a first predetermined value.

21. The disk driver of claim 20, wherein the first edge counter disregards the edges detected during a period other than the first period, and the second edge counter disregards the edges detected during the period other than the second period.

22. The disk driver of claim 21, wherein the bit clock generating unit generates the bit clock irrespective of the channel bit interval if the first counter is reset.

23. The disk driver of claim 20, wherein the bit clock generating unit gives priority to the count value of the first counter over the channel bit interval.

24. The disk driver of claim 20, wherein the first period is set based on the count value of the first counter.

25. The disk driver of claim 24, wherein, if the edge detecting unit detects a first edge of the digital signal, the first counter is reset and counts the system clock, where the first counter is reset every time the first edge is detected during the first period.

26. The disk driver of claim 25, further comprising:
a first window signal generating unit generating a first window signal as a signal indicating the first period based on the count value of the first counter and outputting the first window signal to the first edge counter.

27. The disk driver of claim 26, further comprising:
a second counter, wherein, if one of the edges is detected during a period other than the first window signal period after the first edge is detected, the second counter is reset, counts the system clock, and is reset every time the one of the edges is detected during the second period.

28. The disk driver of claim 27, further comprising:
a second window signal generating unit generating a second window signal as a signal indicating the second period based on the count value of the second counter and outputting the second window signal to the second edge counter.

29. The disk driver of claim 27, further comprising:
a state managing unit monitoring outputs of the first counter, the second counter, the edge detecting unit, the first edge counter, and the second edge counter and managing a state of the apparatus generating the bit block.

30. A method of generating a bit clock in a digital data generating system, the method comprising:
detecting edges of a digital signal;
generating a first edge count value by counting a number of the edges detected during a first period;
generating a second edge count value by counting the number of the edges detected during a second period;
setting a state of the digital data generating system as a bit clock lock state if one of the first edge count value and second edge count value is equal to a first predetermined value; and
generating the bit clock using one of the channel bit interval and a first count value, wherein the first count value is reset and generated by counting a system clock every time the edges are detected during the first period in the bit clock lock state.

31. The method of claim 30, wherein the first period is set by using a first window signal generated based on a first count value created when a first edge is detected.

32. The method of claim 31, wherein the second period is set by using a second window signal generated based on a second count value, where the second count value is reset and created by counting the system clock when the first edge is detected during a period other than the first period, and the second count value is reset every time one of the edges is detected during the second period.

33. The method of claim 30, further comprising:
disregarding the edges detected during periods other than the first period and second period.

34. The method of claim 30, wherein generating the bit clock is performed while giving priority to the first count value.

35. A method of generating a bit clock synchronized with a digital signal generated in a digital data generating system, the method comprising:
generating the bit clock by a channel bit interval in a bit clock unlock state;
converting the bit clock unlock state into a bit clock lock ready state if a first edge of the digital signal is detected;
generating a first edge count value by counting a number of edges detected during a first period in the bit clock lock ready state;
generating a second edge count value by counting the number of the edges detected during a second period in the bit clock lock ready state;
converting the bit clock lock ready state into a bit clock lock state if the first edge count value or the second edge count value is equal to a first predetermined value; and
generating the bit clock based on one of a first count value, wherein the first count value is reset and generated by counting a system clock every time one of the edges is detected during the first period in the bit clock lock state.

36. The method of claim 35, further comprising:
disregarding the edges detected during periods other than the first and second periods.

37. The method of claim 35, further comprising:
generating the bit clock based on one of the channel bit interval and the first count value while maintaining the bit clock lock ready state if neither the first edge count value nor the second edge count value is equal to the first predetermined value.

38. The method of claim 35, wherein the first period is set by using a first window signal generated based on the first count value, where the first count value is reset and created by counting the system clock when the first edge is detected.

39. The method of claim 38, wherein the second period is set by using a second window signal generated based on a second count value, where the second count value is reset and generated by counting the system clock when the first edge is detected during the first period, and the second count value is reset and created by counting the system clock every time one of the edges is detected during the second period.

40. The method of claim 35, wherein generating the bit clock is performed while giving priority to the first count value over the channel bit interval.

* * * * *